United States Patent
Evans et al.

(10) Patent No.: US 6,856,647 B1
(45) Date of Patent: Feb. 15, 2005

(54) METHODS AND SYSTEMS FOR NEUTRAL-TO-GROUND COMMUNICATION

(75) Inventors: Scott C. Evans, Burnt Hills, NY (US); John E. Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 813 days.

(21) Appl. No.: 09/690,618

(22) Filed: Oct. 17, 2000

(51) Int. Cl.[7] .................................................. H04M 7/02
(52) U.S. Cl. .................................... 375/218; 379/22.07
(58) Field of Search ......................... 375/218; 379/22.07

(56) References Cited

U.S. PATENT DOCUMENTS

| | | |
|---|---|---|
| 4,408,186 A | 10/1983 | Howell |
| 4,433,326 A | 2/1984 | Howell |
| 4,636,771 A | 1/1987 | Ochs |
| 4,668,934 A | 5/1987 | Shuey |
| 4,755,792 A | 7/1988 | Pezzolo et al. |
| 4,815,106 A | 3/1989 | Propp et al. |
| 4,890,089 A | 12/1989 | Shuey |
| 4,912,553 A * | 3/1990 | Pal et al. .................. 725/79 |
| 5,066,939 A | 11/1991 | Mansfield, Jr. |
| 5,349,644 A | 9/1994 | Massey et al. |
| 5,497,142 A | 3/1996 | Chaffanjon |
| 5,614,770 A * | 3/1997 | Suelzle ..................... 307/105 |
| 5,694,108 A | 12/1997 | Shuey |
| 5,757,177 A | 5/1998 | Farnsworth |
| 5,818,821 A | 10/1998 | Schurig |
| 5,852,785 A | 12/1998 | Bartholomew et al. |
| 5,866,956 A | 2/1999 | Marsh et al. |
| 5,933,073 A | 8/1999 | Shuey |
| 5,970,127 A | 10/1999 | Smith et al. |
| 6,426,632 B1 * | 7/2002 | Clunn ....................... 324/509 |

* cited by examiner

*Primary Examiner*—Mohammed Ghayour
*Assistant Examiner*—Pankaj Kumar
(74) *Attorney, Agent, or Firm*—Fletcher Yoder

(57) ABSTRACT

A method of distributing wide band data using a neutral-to-ground circuit within an electrical wiring installation includes modifying a load center with an interface module which interfaces to the neutral-to-ground circuit and configuring the interface module to compensate for varying impedance within the neutral-to-ground circuit to improve data transmission characteristics. Multiple embodiments are included within the method for compensation of varying impedance including channel sounding, spectral waterfilling, and communications using spread spectrum techniques, for example, frequency hopping and direct sequencing techniques.

42 Claims, 3 Drawing Sheets

METHODS AND SYSTEMS FOR NEUTRAL-TO-GROUND COMMUNICATION

BACKGROUND OF THE INVENTION

This invention relates generally to data transmission and more specifically to high speed data distribution over residential electrical wiring.

High speed transmission of data throughout a residence facilitates performing home automation functions such as home security and appliance controls. Residential electrical systems can be used for data communication within a residence. For existing residences, wiring in the residential electrical systems is advantageous to use because, in most instances, use of such wiring facilitates installation of a communication system.

The installation of dedicated data wiring is one alternative to the use of the residential electrical system, for data communication, but is undesirable due to cost and other factors. The other factors include the invasiveness of dedicated data wire installation in existing structures either requiring unsightly installations along baseboards, ceilings, and walls or damage and repair to walls when attempting to install behind existing wallboard or plaster walls.

Data can be transmitted over residential electrical wiring using a neutral-to-ground circuit of the residential wiring system. Using neutral-to-ground circuits for the transmission of data within a residence has advantages over line-to-ground or line-to-neutral circuits since the voltage present on the line circuit is avoided. However, neutral-to-ground data transmission is also complicated, as is line-to-ground or line-to-neutral data transmission in that the impedance of the circuit changes as devices are plugged into the circuit. Therefore impedances encountered by a data transceiver is constantly changing. The changing impedance affects the nature of optimal signaling techniques and also affects the bandwidth or data carrying capacity of the data transceivers.

It would be desirable to be able to periodically diagnose the impedance of the neutral-to-ground circuit and compensate for detected impedance changes thereby enabling the circuit to maintain a wide data bandwidth thus providing a reliable high-speed data transmission medium which is available to most existing homes and eliminates the cost involved with installation of dedicated data wiring.

BRIEF SUMMARY OF THE INVENTION

In an exemplary embodiment, a method of distributing wide band data using a neutral-to-ground circuit includes modifying a load center with an interface module configured to interface with the neutral-to-ground circuit and configuring the interface module to compensate for varying impedance within the neutral-to-ground circuit.

A circuit breaker box within a residence is one example of a load center. The interface module is configured to compensate for varying impedance within the neutral-to-ground circuit by coupling an impedance to the circuit to improve data transmission characteristics. The coupled impedance within the interface module can be varied to maintain the data transmission characteristics as the impedance of the neutral-to-ground circuit changes. The interface module also serves as the interface for the transmission and reception of data along the neutral-to-ground circuit.

DETAILED DESCRIPTION OF THE INVENTION

Figure 1:
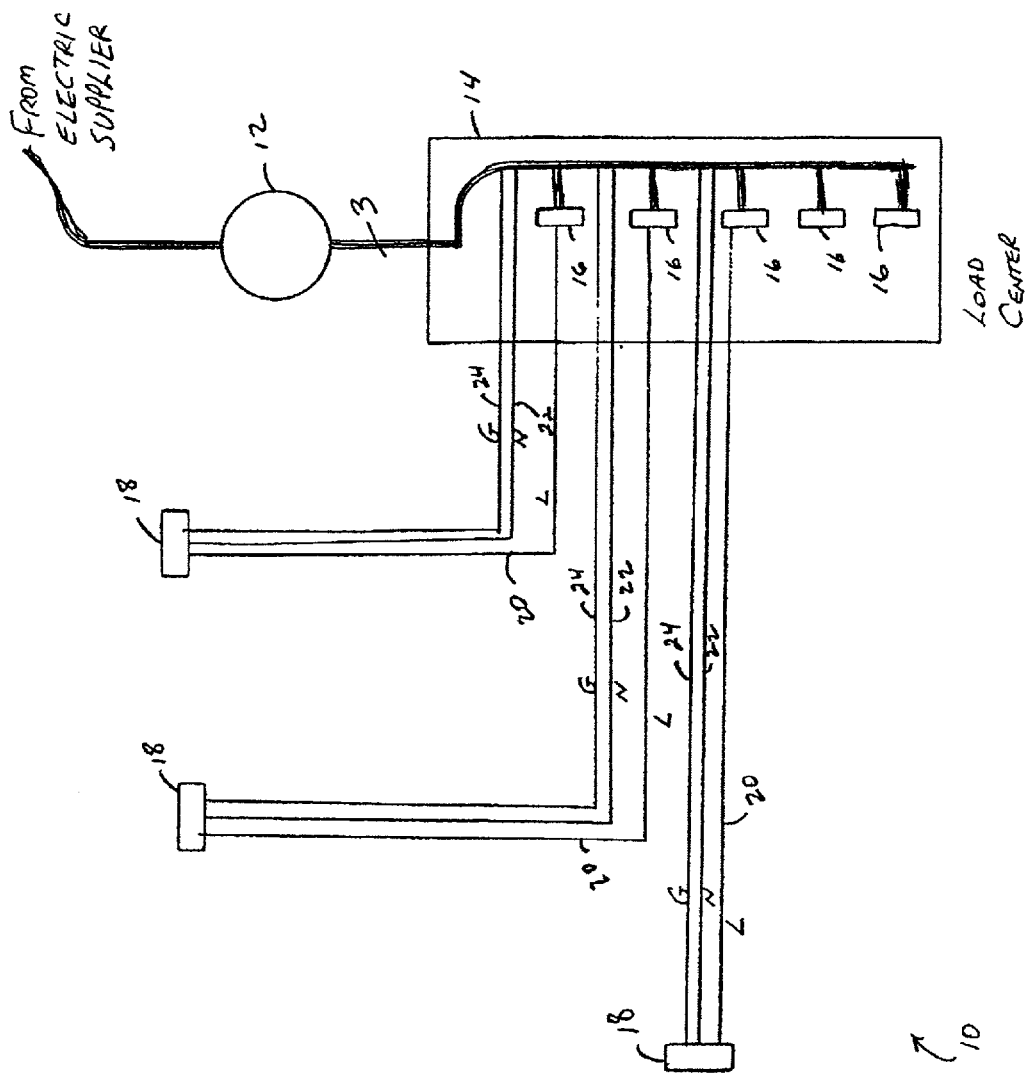
FIG. 1 is a schematic diagram of a residential wiring circuit including a load center.

FIG. 1 is a schematic diagram 10 of a residential wiring circuit. Typically, a supply of power is routed from an electric supplier, either underground or otherwise, and is connected to a customers residence or business at an electric meter 12 at which point the electric wiring enter the customers residence. Inside the residence, there is typically a load center 14, which may also be called a fuse box or a breaker box, at which point the electric supply is divided into individual circuits for distribution throughout the residence. The electric supply is divided at breakers 16 and distributed throughout the residence to electrical outlets 18. While FIG. 1 is a simplified diagram, electrical distribution throughout a residence is based on use. A circuit to an oven, for example, may be one individual circuit, while multiple wall outlets to one or more bedrooms, may be another individual circuit. Most electrical systems are of three wire design which are designated individually as line 20, neutral 22 and ground 24. In most installations, neutral 22 and ground 24 are electrically connected, or "tied together" within load center 14. As the separate neutral 22 and ground 24 wires are routed from load center 14 throughout the residence, an impedance can be found between neutral 22 and ground 24 due to the long lengths of wire needed to wire a residence for electricity and due to the loading of the individual circuits with lighting, appliances, televisions, computers and the like.

Figure 2:
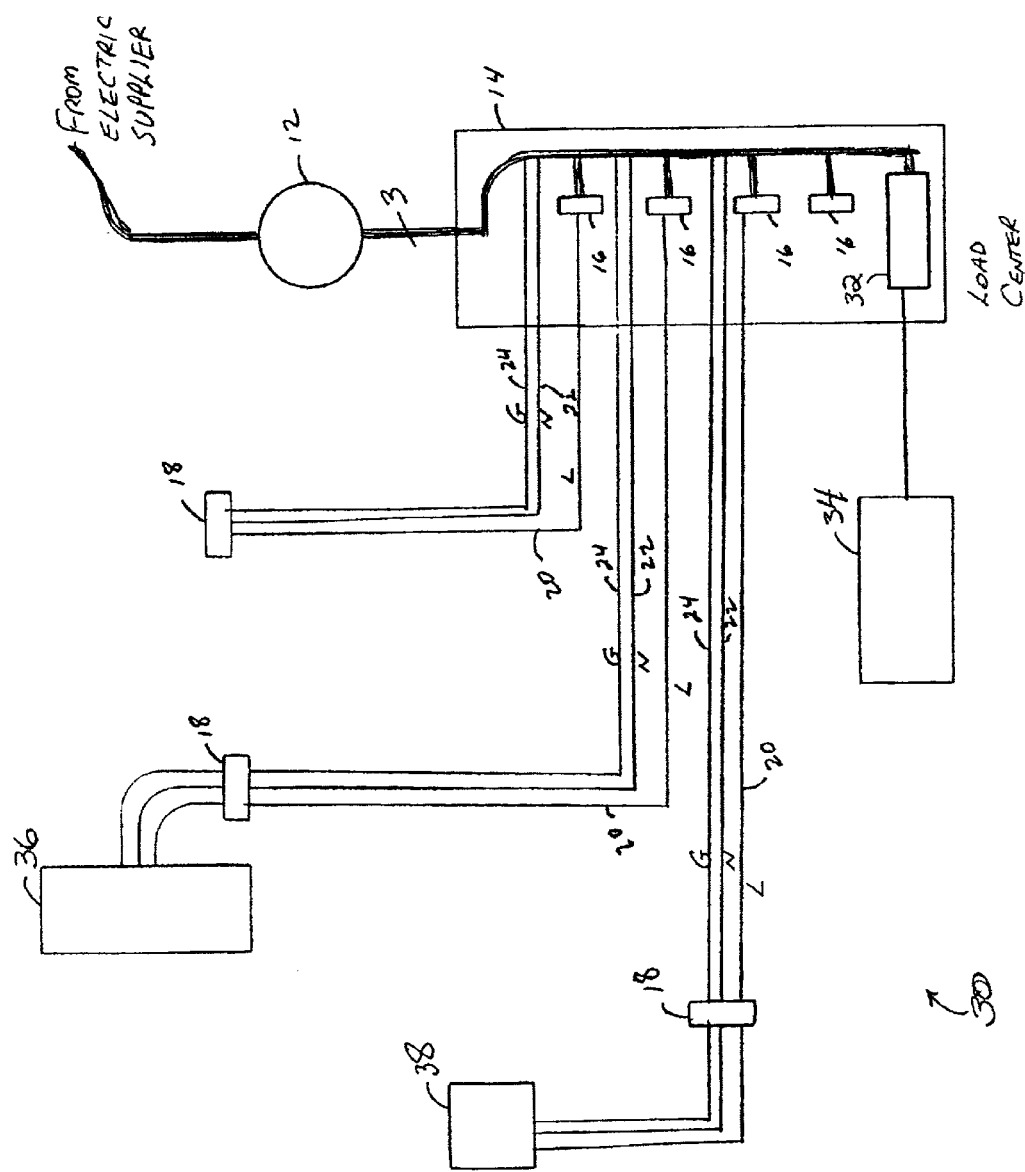
FIG. 2 is a schematic diagram of a residential wiring circuit including components of a high speed data transmission system.

FIG. 2 is a schematic diagram of a residential wiring circuit 30 including one embodiment of a high speed data transmission system. Components in circuit 30, identical to components of diagram 10 (shown in FIG. 1), are identified in FIG. 2 using the same reference numerals as used in FIG. 1. In addition, there is included in FIG. 2 an interface module 32, a data transceiver/external controller 34, a data dependent device 36 which is configured for communication along the neutral-to-ground circuit with controller 34, and a transceiver 38 which is also configured for communication along the neutral-to-ground circuit with controller 34. In one embodiment, and as shown in FIG. 2, interface module 32 is physically located within load center 14. Alternatively, interface module 32 is located external to load center 14.

Interface module 32 is configured to compensate for varying impedance within the neutral-to-ground circuit. In one embodiment, interface module 32 assesses a data rate capacity of the neutral-to-ground circuit as a data channel and establishes a signaling rate. Assessment of data rate capacity may include determining the impedance of the neutral-to-ground circuit data channel as a function of frequency using methods described below.

Figure 3:
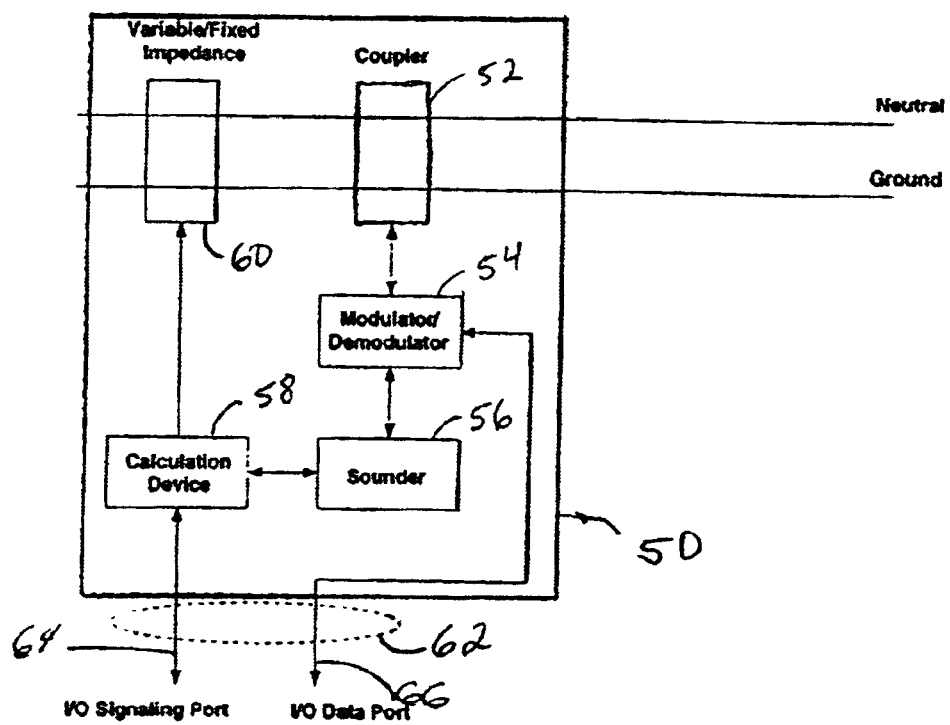
FIG. 3 is a block diagram of an interface module configured to adjust impedance of a neutral-to-ground circuit.

FIG. 3 is a block diagram of interface module 32 configured to determine and adjust the impedance of a neutral-to-ground circuit within a residence according to one embodiment of the present invention. Interface module 32 includes a coupler 52 which couples to the neutral-to-ground circuit for the transmission and reception of data. In one embodiment, coupler 52 is an isolation transformer. In another embodiment, coupler 52 is a capacitive coupling device. Other embodiments of coupler 52 exist which include any device configured to transfer signal data onto the neutral-to-ground circuit.

Interface module 32 further includes a modulator/demodulator 54 for formatting transmitted and received data. In one embodiment, modulator/demodulator 54 includes a voltage controlled oscillator (not shown) which creates a signaling waveform capable of being transmitted on the neutral-to-ground circuit. In another embodiment, a comb filter (not shown), which converts a received signal into a set of orthogonal components, demodulates data received from the neutral-to-ground circuit for external processing. However modulator/demodulator 54 includes other devices which are capable of creating and receiving signaling waveforms, for data transmission and reception protocols, for example, CE Bus and RS-232.

Interface module 32 also includes a sounder 56 which is configured to generate short pulses or impulses for transmission onto the neutral-to-ground circuit, as described above. Sounder 56 further receives an impulse response from the neutral-to-ground circuit from which transmission characteristics of the neutral-to-ground circuit can be ascertained, based upon a spectrum of the response compared to a spectrum of the transmitted impulse. A calculation device 58 within interface module 32 is configured to determine an amount of impedance to be added or subtracted from the neutral-to-ground circuit based upon the response to the impulse received as compared to the impulse generated by sounder 56. In one embodiment, calculation device 58 is microprocessor based and configured to execute a program which determines the required impedance on the neutral-to-ground circuit based upon the impulse response described above.

A variable or fixed impedance 60 includes both resistive and reactive loads which are applied across the neutral-to-ground circuit based upon commands received from calculation device 58. An interface 62 to external controller 34, (shown in FIG. 2) which includes an input/output (I/O) signaling port 64 and an input/output (I/O) data port 66. I/O data port 66 serves as the data interface to external controller 34. I/O signaling port 64 is a port to calculation device 58. Through I/O signaling port 64, external controller 34 communicates to interface module 32 the desired data transmission rates along the neutral-to-ground circuit and initiates operation of interface module 32 as above described. I/O signaling port 64 also is the port which transmits back to external controller 34 the data rate capacity of the neutral-to-ground circuit, based upon impulse response characteristics and applied impedance as calculated by calculation device 58.

One method of determining transmission characteristics and therefore impedance of the neutral-to-ground circuit data channel using interface module 32 as described above, includes sounder 56 signaling modulator/demodulator 54, based upon commands from calculation device 58, to send a short pulse having a spectral occupancy equal to the highest signaling bandwidth available to modulator/demodulator 54 onto the neutral-to-ground circuit data channel via coupler 52. The method continues by sampling the pulse with transceiver 38 (shown in FIG. 2), computing the power spectral density of the short pulse at the transceiver and reporting the spectral coefficients back to interface module 32 using a low rate conventional, signaling scheme. The reported spectral coefficients are used by calculation device 58 to determine impedance of the neutral-to-ground circuit.

Another method of determining impedance of the neutral-to-ground circuit using interface module 32 is to transmit the short pulse as described above onto and along the neutral-to-ground circuit to transceiver 38. Transceiver 38 is configured to receive the transmitted pulse and to transmit the pulse as received back to interface module 32 along the neutral-to-ground circuit. Interface module 32 is configured to then process the signal received back from transceiver 38 with calculation device 58 to determine the impedance of the neutral-to-ground circuit. Such a determination is made based upon changes within the components of the original transmitted pulse, for example, certain frequency elements from the pulse may be lost due to impedance characteristics of the neutral-to-ground circuit.

After a determination of impedance the neutral-to-ground circuit, interface module 32 is configured to determine if the neutral-to-ground circuit will support data transport at the rate requested by external controller 34. Calculation device 58 is configured to compensate for varying impedance within the neutral-to-ground circuit by adjusting variable impedance 60 to a value which improves the neutral-to-ground circuits impedance characteristics as a data carrier. One such method for adjusting impedance for improvement in reliability of data transmission is known in the art as hill climbing.

Interface module 32 is configurable to hill climb which is best described as a technique for optimizing a multi-input function by maximizing a complicated, non-linear function based on a selection of the multiple input variables. In one embodiment, interface module 32 is configured to choose, arbitrarily if necessary, an initial set of input values for a function, which are impedances based on a set of adjustable discrete elements, such as resistors, capacitors and inductors within variable impedance 60. The function is evaluated based upon impedances selected as the input for the function and the function output value is saved. The function output value is termed known value.

The inputs to the function are then perturbed, randomly or deterministically, singly or in a plurality, and the function's value computed or measured for the new set of values of the input impedances. If the function is closer to a desired value over its previously known value, the new set of input variables is adopted as the new set of preferred input impedances and the new value of the function becomes the new known value.

The perturbation to the input variables that results in a new known value is regarded as a hill climbing direction and this direction is searched for a local maximum of the known value. For variable impedance 60, such a value can be complex impedance, amplitude and phase over a wide bandwidth. The local maximum search may be done by any of a suite of well-known techniques such as a bisection search or a least squares fit between a frequency dependent impedance curve and a desired impedance curve over a spectrum of interest.

Once a local maximum has been determined, a new hill climbing direction is chosen, randomly or deterministically, and the process is repeated. The hill climbing approach continues until a limit on computing time, a number of iterations or other limiting factors are reached.

One method of adjusting a variable impedance 60 within interface module 32 to improve data transmission characteristics includes spectral waterfilling, which is the spectral matching of the signaling waveform to the neutral-to-ground circuit data channels spectral transfer function. Noise power spectral density on the data channel is estimated and measured channel impedance transfer function appropriately adjusted before waterfilling.

Calculation device 58 can alternatively determine a maximum signaling rate, or data rate, the present impedance of the neutral-to-ground will support and pass that information to external controller 34.

In one alternative embodiment, a fixed impedance can be introduced onto the neutral-to-ground circuit. Interface module 32 is configurable to compensate for varying impedance in the neutral-to-ground circuit by switching in a fixed impedance 60 within interface module 32 that configures the neutral-to-ground circuit to accommodate numerous communication carriers or bands of communications frequencies.

While the methods and devices described herein refer to residential wiring and data transmission, residential is but one example of such an application of the embodiments herein described and the embodiments should not be construed to be so limited. The embodiments herein described are equally applicable to other applications including, but not limited to, commercial, industrial and any other installation of electrical wiring. In addition, supported data transmission protocols are not specifically described within the embodiments. Any communications protocol can be adapted or bridged to the power line neutral-to-ground circuit. For example, ethernet communications is bridged to the neutral-to-ground circuit using a gateway device such as a computer with a power line modem.

While the invention has been described in terms of various specific embodiments, those skilled in the art will recognize that the invention can be practiced with modification within the spirit and scope of the claims.

What is claimed is:

1. A method of distributing wide band data using a neutral-to-ground circuit, said method comprising the steps of:

modifying a load center by coupling an interface module to the neutral-to-ground circuit; and configuring the interface module to compensate for varying impedance within the neutral-to-ground circuit by assessing a data rate capacity of the neutral-to-ground circuit as a data channel, and establishing a signaling rate for data transmission and reception.

2. A method according to claim 1 wherein said step of assessing a data rate capacity of the neutral-to-ground circuit further comprises the step of determining the impedance of the neutral-to-ground circuit data channel as a function of frequency.

3. A method according to claim 2 wherein said step of determining the impedance of the neutral-to-ground circuit data channel further comprises the steps of:

commanding a modulator/demodulator within the interface module to send a short pulse having a spectral occupancy equal to the highest signaling bandwidth available to the modulator/demodulator onto the neutral-to-ground circuit data channel;

sampling the pulse with a transceiver also on the neutral-to-ground circuit data channel;

computing the power spectral density of the short pulse at the transceiver; and reporting the spectral coefficients back to the interface module using a low rate conventional signaling scheme.

4. A method according to claim 2 wherein said step of determining the impedance of the neutral-to-ground circuit data channel further comprises the steps of:

commanding a modulator/demodulator within the interface module to send a short pulse having a spectral occupancy equal to the highest signaling bandwidth available to the modulator/demodulator onto the neutral-to-ground circuit data channel;

receiving the pulse with a transceiver also on the neutral-to-ground circuit data channel;

repeating back the pulse as received at the transceiver to the interface module; and processing the signal received back from the transceiver to determine the impedance of the neutral-to-ground circuit.

5. A method according to claim 1 wherein said step of configuring the interface module to compensate for varying impedance further comprises the step of adjusting a variable impedance within the interface module to a value which improves the neutral-to-ground circuits impedance characteristics as a data carrier.

6. A method according to claim 5 wherein said step of varying a variable impedance within the interface module further comprises the step of maximizing a function of neutral-to-ground circuit impedance as a function of variable impedance.

7. A method according to claim 6 wherein said step of maximizing a function of neutral-to-ground circuit impedance further comprises the steps of:

choosing an initial set of function input impedance values;

evaluating the function and saving an output value;

changing input impedance values and reevaluating function output value; and determining if the function output value is closer to a desired value than the initial function evaluation.

8. A method according to claim 7 further comprising the step of repeating the steps of changing input impedance values and reevaluating function output value and determining if the function output value is closer to a desired value until a desired value for the function output value is obtained.

9. A method according to claim 5 wherein said step of varying a variable impedance within the interface module further comprises the step of spectral waterfilling by spectrally matching the signaling waveform to the neutral-to-ground circuit data channels spectral transfer function.

10. A method according to claim 1 wherein said step of configuring the interface module to compensate for varying impedance further comprises the step of switching in a fixed impedance within the interface module that accommodates numerous communication carriers or bands of communications frequencies.

11. A method according to claim 1 wherein said step of establishing a signaling rate further comprises the step of communicating to an external controller a maximum supported data rate via the interface module.

12. An interface module configured to interface with a neutral-to-ground circuit within the electrical wiring of a structure, for wide band data communications along the wiring, and further configured to interface to the wiring at or near a load center for the wiring, said interface module comprising:

one of a variable or fixed impedance source coupled to the neutral-to-ground circuit;

a coupling to the neutral-to-ground circuit;

a modulator/demodulator configured for formatting transmitted and received data and interfaced to said coupling;

a sounder configured to generate impulses for transmission onto the neutral-to-ground circuit and interfaced to said modulator/demodulator;

a calculation device configured to determine an amount of impedance to be added to the neutral-to-ground circuit based upon a response received from said sounder and interfaced to said sounder and said variable or fixed impedance;

an input/output signaling port interfaced to said calculation device; and an input/output data port interfaced to said modulator/demodulator.

13. An interface module according to claim 12 wherein said calculation device is configured to receive a desired signaling rate from an external controller via said input/output signaling port.

14. An interface module according to claim 12 configured to assess a data rate capacity of the neutral-to-ground circuit as a data channel.

15. An interface module according to claim 12 configured to determine the impedance of the neutral-to-ground circuit data channel as a function of frequency.

16. An interface module according to claim 12 wherein said modulator/demodulator is configured to send a short pulse having a spectral occupancy equal to the highest signaling bandwidth available to the modulator/demodulator onto the neutral-to-ground circuit data channel.

17. An interface module according to claim 16 configured to receive spectral coefficients using a low rate conventional signaling scheme from a transceiver also on the neutral-to-ground circuit data channel which has sampled the short pulse and computed the power spectral density of the short pulse.

18. An interface module according to claim 16 configured to receive the short pulse repeated back from a transceiver also on the neutral-to-ground circuit data channel and process the repeated back pulse received from the transceiver to determine the impedance of the neutral-to-ground circuit.

19. An interface module according to claim 12 configured to adjust said variable impedance source within said interface module to a value which improves the neutral-to-ground circuits impedance characteristics as a data carrier.

20. An interface module according to claim 19 configured to maximize a function of neutral-to-ground circuit impedance as a function of input impedance values.

21. An interface module according to claim 20 configured to choose an initial set of function input impedance values, evaluate the function and save a function output value, change input impedance values and reevaluate the function output value and determine if the new function output value is closer to a desired value.

22. An interface module according to claim 21 configured to change input impedance values, reevaluate the function output value and determine if the function output value is closer to a desired value until a desired value for the function output value is obtained.

23. An interface module according to claim 19 configured to perform a spectral waterfilling by spectrally matching the signaling waveform to the neutral-to-ground circuit data channels spectral transfer function.

24. An interface module according to claim 12 configured to switch in a fixed impedance within the interface module that accommodates numerous communication carriers or bands of communications frequencies.

25. An interface module according to claim 24 configured to communicate to an external controller a maximum supported data rate via the interface module.

26. A data transmission system configured for the transmission of wide band data across an electrical wiring installation, said system comprising:

at least one neutral-to-ground circuit configured as a data channel;

a load center where neutral and ground are electrically connected;

an interface module configured to interface with said neutral-to-ground circuit, at or near said load center, and configured to couple one of a variable or fixed impedance source to the neutral-to-ground circuit, wherein said interface module is configured to send a short pulse having a spectral occupancy equal to the highest signaling bandwidth available to a modulator/demodulator within said interface module onto said neutral-to-ground circuit; and an external controller.

27. A data transmission system according to claim 26 wherein said interface module is configured to receive a desired signaling rate from said external controller.

28. A data transmission system according to claim 26 wherein said interface module is configured to assess a data rate capacity of said neutral-to-ground circuit data channel.

29. A data transmission system according to claim 26 wherein said interface module is configured to determine an impedance of said neutral-to-ground circuit data channel as a function of frequency.

30. A data transmission system according to claim 26 wherein said interface module is configured to receive spectral coefficients using a low rate conventional signaling scheme from a transceiver coupled to said neutral-to-ground circuit data channel which has sampled the short pulse and computed the power spectral density of the short pulse.

31. A data transmission system according to claim 26 wherein said interface module is configured to receive the short pulse repeated back from a transceiver coupled to said neutral-to-ground circuit data channel and process the repeated back pulse received from said transceiver to determine the impedance of said neutral-to-ground circuit.

32. A data transmission system according to claim 26 wherein said interface module is configured to adjust an impedance coupled to said neutral-to-ground circuit within said interface module to a value which improves the neutral-to-ground circuits impedance characteristics as a data carrier.

33. A data transmission system according to claim 32 wherein said interface module is configured to maximize a function of neutral-to-ground circuit impedance as a function of input impedance values.

34. A data transmission system according to claim 33 wherein said interface module is configured to choose an initial set of function input impedance values, evaluate the function and save a function output value, change input impedance values and reevaluate the function output value and determine if the new function output value is closer to a desired value.

35. A data transmission system according to claim 34 wherein said interface module is configured to change input impedance values, reevaluate the function output value and determine if the function output value is closer to a desired value until a desired value for the function output value is obtained.

36. A data transmission system according to claim 32 wherein said interface module is configured to perform a spectral waterfilling by spectrally matching the signaling waveform from said external controller to said neutral-to-ground circuit data channels spectral transfer function.

37. A data transmission system according to claim 26 wherein said interface module is configured to switch in a fixed impedance within said interface module that accommodates numerous communication carriers or bands of communications frequencies.

38. A data transmission system according to claim 27 wherein said interface module is configured to communicate to said external controller a maximum supported data rate for said neutral-to-ground circuit.

39. A method of distributing wide band data using a neutral-to-ground circuit, said method comprising the steps of:

modifying a load center by coupling an interface module to the neutral-to-ground circuit; and configuring the interface module to compensate for varying impedance within the neutral-to-ground circuit, comprising the step of:

adjusting a variable impedance within the interface module to a value which improves the neutral-to-ground circuits impedance characteristics as a data carrier, wherein said step of adjusting a variable impedance within the interface module further comprises the step of maximizing a function of neutral-to-ground circuit impedance as a function of variable impedance.

40. A method of distributing wide band data using a neutral-to-ground circuit, said method comprising the steps of:

modifying a load center by coupling an interface module to the neutral-to-ground circuit; and configuring the interface module to compensate for varying impedance within the neutral-to-ground circuit comprising the step of:

switching in a fixed impedance within the interface module that accommodates numerous communication carriers or bands of communication frequencies.

41. A data transmission system configured for the transmission of wide band data across an electrical wiring installation, said system comprising:

at least one neutral-to-ground circuit configured as a data channel;

a load center where neutral and ground are electrically connected;

an interface module configured to:

(a) interface with said neutral-to-ground circuit, at or near said load center;

(b) couple one of a variable or fixed impedance source to the neutral-to-ground circuit;

(c) adjust an impedance coupled to said neutral-to-ground circuit within said interface module to a value which improves the neutral-to-ground circuits impedance characteristics as a data carrier; and (d) maximize a function of neutral-to-ground circuit impedance as a function of input impedance values; and an external controller.

42. A data transmission system configured for the transmission of wide band data across an electrical wiring installation, said system comprising:

at least one neutral-to-ground circuit configured as a data channel;

a load center where neutral and ground are electrically connected;

an interface module configured to:

(a) interface with said neutral-to-ground circuit, at or near said load center;

(b) couple one of a variable or fixed impedance source to the neutral-to-ground circuit; and (c) switch in a fixed impedance within said interface module that accommodates numerous communication carriers or bands of communication frequencies; and an external controller.

* * * * *